(12) United States Patent
Silavong et al.

(10) Patent No.: US 12,197,911 B2
(45) Date of Patent: Jan. 14, 2025

(54) SYSTEMS AND METHODS FOR MULTI-SIGNAL PATTERN MATCHING WITH GRAPH PROPAGATION

(71) Applicant: JPMORGAN CHASE BANK, N.A., New York, NY (US)

(72) Inventors: Fanny Silavong, London (GB); Sean Moran, London (GB); Georgios Papadopoulos, London (GB); Solomon Olaniyi Adebayo, Glasgow (GB); William Covell, Weston, CT (US); Rob Otter, Witham (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 304 days.

(21) Appl. No.: 17/653,594

(22) Filed: Mar. 4, 2022

(65) Prior Publication Data
US 2023/0229440 A1    Jul. 20, 2023

(30) Foreign Application Priority Data
Jan. 18, 2022   (GR) .............................. 20220100047

(51) Int. Cl.
*G06F 8/73*    (2018.01)
*G06F 16/906*    (2019.01)

(52) U.S. Cl.
CPC .............. *G06F 8/73* (2013.01); *G06F 16/906* (2019.01)

(58) Field of Classification Search
CPC .......... G06F 8/73; G06F 16/906; G06N 20/00
See application file for complete search history.

(56) References Cited

U.S. PATENT DOCUMENTS

| | | | | |
|---|---|---|---|---|
| 7,853,344 B2* | 12/2010 | Khan | ...................... | G06F 16/68 706/12 |
| 11,003,444 B2* | 5/2021 | Zhou | ........................ | G06F 8/72 |
| 2010/0050151 A1* | 2/2010 | Balasubramanian | ..... | G06F 8/33 717/105 |
| 2012/0226492 A1* | 9/2012 | Tsuboi | ................... | G06F 40/30 704/9 |

(Continued)

*Primary Examiner* — S. Sough
*Assistant Examiner* — Zheng Wei
(74) *Attorney, Agent, or Firm* — GREENBERG TRAURIG LLP

(57) ABSTRACT

A method may include: retrieving a plurality of code snippets from code repositories; generating a syntax representation, a property representation for each of the code snippets; receiving a query comprising a query code snippet, natural language keywords, and/or a string pattern; performing string-based matching and parser/syntax tree matching on the query and the tree representations, syntax matching on the query and the syntax representations, and property matching on the query and the property representations, wherein each of the matchings results in a score; combining the scores of the string-based matching, the parser/syntax tree matching, the syntax matching, and/or the property matching; identifying a plurality of code snippets of interest based on the combined scores; classifying the code snippets of interest using a machine learning classifier; outputting a list of the code snippets of interest with their classifications; and training the machine learning classifier based on user feedback.

18 Claims, 2 Drawing Sheets

(56) References Cited

U.S. PATENT DOCUMENTS

| | | | |
|---|---|---|---|
| 2014/0173563 A1* | 6/2014 | Dias | G06F 8/74 |
| | | | 717/123 |
| 2015/0046492 A1* | 2/2015 | Balachandran | G06F 8/36 |
| | | | 707/772 |
| 2016/0063062 A1* | 3/2016 | Yahav | G06F 16/90335 |
| | | | 707/769 |
| 2019/0324731 A1* | 10/2019 | Zhou | G06F 8/427 |
| 2019/0392075 A1* | 12/2019 | Han | G06F 16/285 |
| 2021/0209303 A1* | 7/2021 | Ben-Natan | G06F 16/285 |
| 2022/0107799 A1* | 4/2022 | Wu | G06N 20/00 |

* cited by examiner

SYSTEMS AND METHODS FOR MULTI-SIGNAL PATTERN MATCHING WITH GRAPH PROPAGATION

RELATED APPLICATIONS

This application claims priority to, and the benefit of, Greek Patent Application Number 20220100047, filed Jan. 18, 2022, the disclosure of which is hereby incorporated, by reference, in its entirety.

BACKGROUND OF THE INVENTION

1. Field of the Invention

Embodiments relate generally to systems and methods for multi-signal pattern matching with graph propagation.

2. Description of the Related Art

A commonplace problem that engineering teams face is to accurately classify and flag sensitive patterns in code. For example, this may include highly confidential data, important items in a script (e.g., time zone related items), etc. Inadequate code inspection can cause a significant amount of disruption to a business, a loss of customer confidence, and may also hurt revenues. Badly developed and poorly inspected code can even have life-threatening effects.

SUMMARY OF THE INVENTION

Systems and methods for multi-signal pattern matching with graph propagation are disclosed. According to one embodiment, a method for multi-signal pattern matching with graph propagation may include: (1) retrieving, by a multi-signal matching computer program executed by an electronic device, a plurality of code snippets from one or more code repositories; (2) generating, by the multi-signal matching computer program, a tree representation, a syntax representation, a property representation for each of the plurality of code snippets; (3) receiving, by the multi-signal matching computer program, a query comprising a query code snippet, natural language keywords, and/or a string pattern; (4) performing, by the multi-signal matching computer program, string-based matching and parser/syntax tree matching on the query and the tree representations, syntax matching on the query and the syntax representations, and property matching on the query and the property representations, wherein each of the matchings results in a score; (5) combining, by the multi-signal matching computer program, the scores of at least two the string-based matching, the parser/syntax tree matching, the syntax matching, and the property matching; (6) identifying, by the multi-signal matching computer program, a plurality of code snippets of interest based on the combined scores; (7) classifying, by the multi-signal matching computer program using a machine learning classifier, the code snippets of interest, wherein the machine learning classifier is trained using user annotations and/or a label dataset; (8) outputting, by the multi-signal matching computer program, a list of the code snippets of interest with their classifications; (9) receiving, by the multi-signal matching computer program, user feedback on the classifications; and (10) training, by the multi-signal matching computer program, the machine learning classifier based on the feedback.

In one embodiment, the code snippets of interest may include code snippets having a highest combined score, a combined score above a threshold, etc.

In one embodiment, the method may also include identifying, by the multi-signal matching computer program, dependencies between the code snippets of interest, and propagating, by the multi-signal matching computer program, the dependencies in a graph.

In one embodiment, the method may also include linking, by the multi-signal matching computer program, one of the code snippets with a signal.

In one embodiment, the signal may indicate whether the code snippet has caused an incident in the past.

According to another embodiment, a system may include a plurality of code repositories, a user interface, and an electronic device executing a multi-signal matching computer program that receives a plurality of code snippets from one or more of the plurality of code repositories, generates a tree representation, a syntax representation, a property representation for each of the plurality of code snippets, receives a query comprising a query code snippet, natural language keywords, and/or a string pattern from the user interface, performs string-based matching and parser/syntax tree matching on the query and the tree representations, syntax matching on the query and the syntax representations, and property matching on the query and the property representations, wherein each of the matchings results in a score, combines the scores of at least two the string-based matching, the parser/syntax tree matching, the syntax matching, and the property matching, identifies a plurality of code snippets of interest based on the combined scores, classifies the code snippets of interest using a machine learning classifier that is trained using user annotations and/or a label dataset, outputs a list of the code snippets of interest with their classifications, receives user feedback on the classifications from the user interface, and trains the machine learning classifier based on the feedback.

In one embodiment, the code snippets of interest may include code snippets having a highest combined score, code snippets having a combined score above a threshold, etc.

In one embodiment, the electronic device executing the multi-signal matching computer program may also identify dependencies between the code snippets of interest and propagates the dependencies in a graph.

In one embodiment, the electronic device executing the multi-signal matching computer program may also link one of the code snippets with a signal.

In one embodiment, the signal may indicate whether the code snippet has caused an incident in the past.

According to another embodiment, an electronic device may include a memory storing a multi-signal matching computer program and a computer processor. When executed by the computer processor, the multi-signal matching computer program causes the computer processor to: receive a plurality of code snippets from one or more of the plurality of code repositories; generate a tree representation, a syntax representation, a property representation for each of the plurality of code snippets; receive a query comprising a query code snippet, natural language keywords, and/or a string pattern from the user interface; perform string-based matching and parser/syntax tree matching on the query and the tree representations, syntax matching on the query and the syntax representations, and property matching on the query and the property representations, wherein each of the matchings results in a score, combines the scores of at least two the string-based matching, the parser/syntax tree matching, the syntax matching, and the property matching; identify a plurality of code snippets of interest based on the combined scores; classify the code snippets of interest using a machine learning classifier that is trained using user annotations and/or a label dataset; output a list of the code snippets of interest with their classification; receive user feedback on the classifications from the user interface; and train the machine learning classifier based on the feedback.

In one embodiment, the code snippets of interest may include code snippets having a highest combined score, code snippets having a combined score above a threshold, etc.

In one embodiment, the multi-signal matching computer program may also cause the computer processor to identify dependencies between the code snippets of interest and propagates the dependencies in a graph.

In one embodiment, the multi-signal matching computer program may also cause the computer processor to execute the multi-signal matching computer program further links one of the code snippets with a signal.

In one embodiment, the signal may indicate whether the code snippet has caused an incident in the past.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for multi-signal pattern matching with graph propagation. Embodiments provide the flexibility to be able to enhance a code inspection software with state-of-the-art statistical and machine learning models, and interpretability because they act as black-box solutions protecting their inner mechanics from public usage.

Embodiments may use multi-signal matching to robustly identify snippets of interest and propagate the signals of interest at a graph level to identify or flag other snippets, such as indirectly impacted snippets. Embodiments may use a machine learning classifier to further refine detections.

Figure 1:
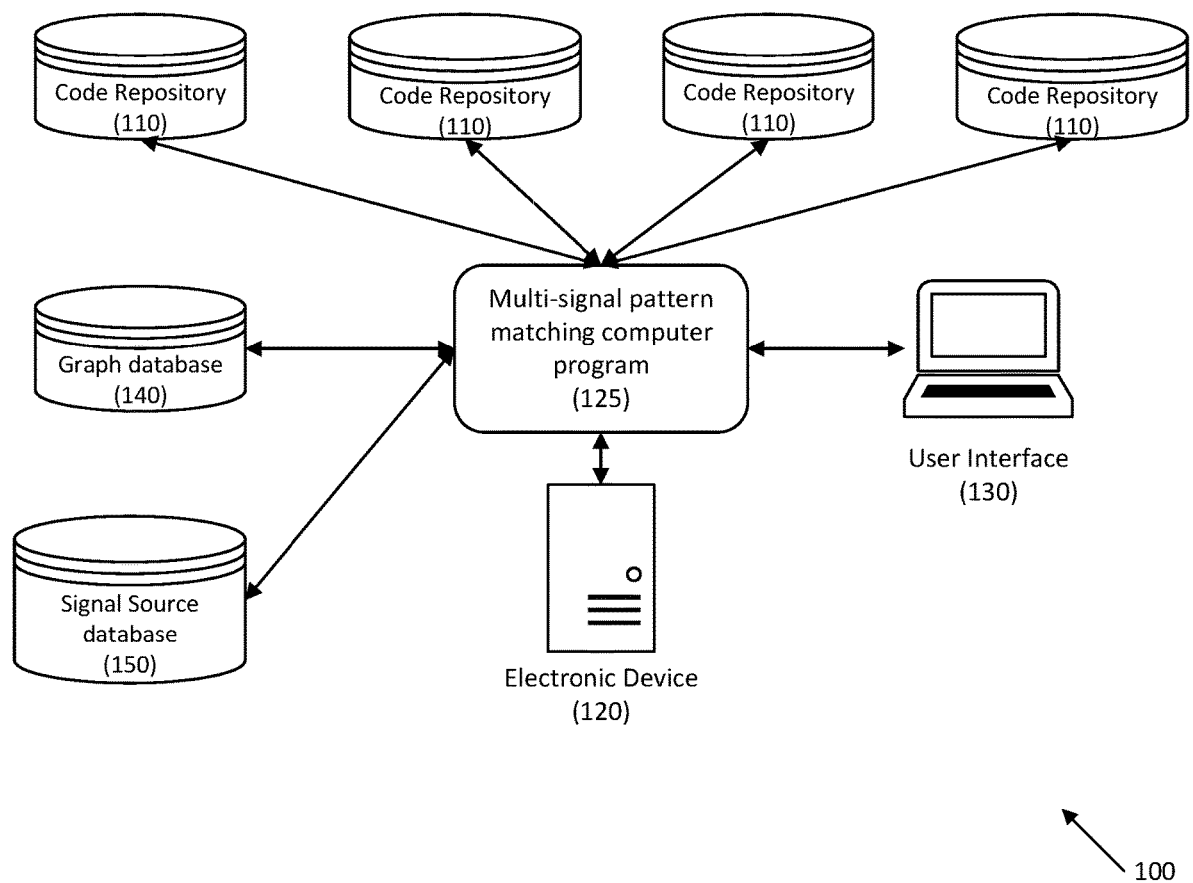
FIG. 1 depicts a system for multi-signal pattern matching with graph propagation according to an embodiment.

Referring to FIG. 1, a system for multi-signal pattern matching with graph propagation is disclosed according to an embodiment. System 100 may include a plurality of code repositories 110. Code repositories 110 may store code in snippets. In one embodiment, code repositories 110 may be provided for different lines of business, entities, etc.

In one embodiment, code repositories 110 may include snippets of source code with its associated metadata, including edit history, timestamps, authors, etc. The metadata may be used later by multi-signal pattern matching computer program 125.

System 100 may further include electronic device 120, which may be any suitable electronic device (e.g., servers (physical and/or cloud-based), workstations, etc.). Electronic device 120 may execute multi-signal pattern matching computer program 125, which may analyze the code snippets in code repositories 110.

In one embodiment, multi-signal pattern matching computer program 125 may include a plurality of modules, including a module for string-based matching, a module for parser/syntax tree matching, a module for syntax matching, and a module for property matching. In another embodiment, multi-signal pattern matching computer program 125 may determine which of these modules to include, the sequence of execution by the modules, etc.

Multi-signal pattern matching computer program 125 may receive query results from user interface 130 and may output results of code snippet analysis to user interface 130. User interface may be provided as an application, a browser, etc., that may be executed on any suitable electronic device. A user may provide feedback to multi-signal pattern matching computer program 125 using user interface 130.

In one embodiment, a graph representation may be generated from source code snippets in one or more code repositories 110. In one embodiment, the graph representation may be generated and stored in graph database 140.

System 100 may further include one or more signal source databases 150 that may be a source of signals, such as incident reports, telemetry, workflow tools, etc.

Figure 2:
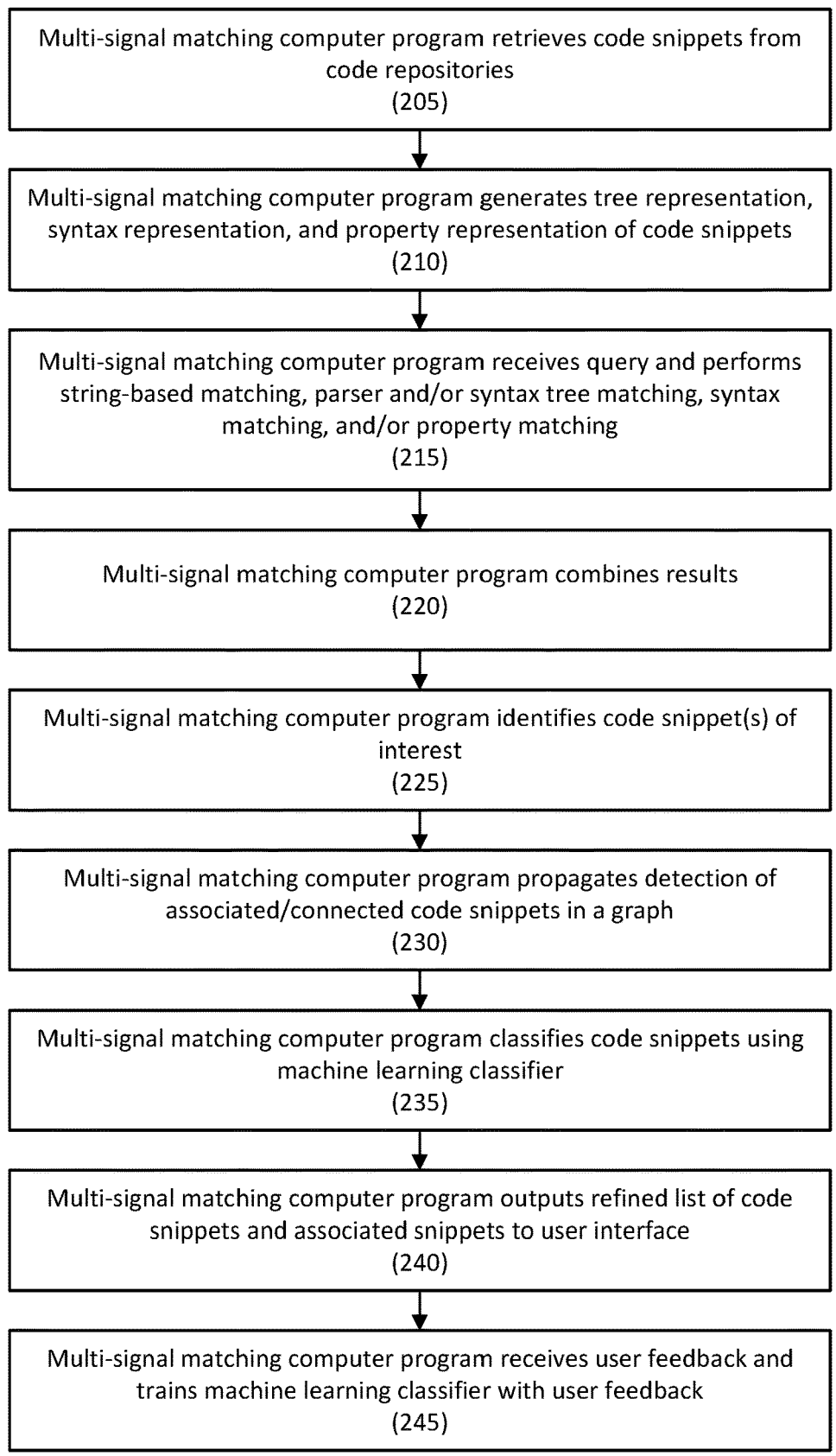
FIG. 2 depicts a method for multi-signal pattern matching with graph propagation according to an embodiment.

Referring to FIG. 2, a method for multi-signal pattern matching with graph propagation is disclosed according to an embodiment.

In step 205, a multi-signal matching computer program executed by an electronic device may access or retrieve code snippets from code repositories. In one embodiment, the code snippets may be retrieved from the code repositories and provide a multi-signal matching computer program.

In step 210, the multi-signal matching computer program may generate a tree representation, a syntax representation, and/or a property representation of one or more code snippets in the code repository. In embodiments, the property representation may require linking the code snippets with other sources of signals, such as whether the code snippet has caused an incident in the past, by connecting historical telemetry around the incidents and the code snippet.

In one embodiment, the representations may be generated for each code snippet in the code repository.

In step 215, the multi-signal matching computer program may receive a query and may perform string-based matching, parser/syntax tree matching, syntax matching, and/or property matching on the query and the representations. The query may have different forms, such as a code snippet, natural language keywords, string patterns, etc. The query may define the search patterns and which signals on which the search is to take place.

The multi-signal matching computer program may perform string-based matching and parser/syntax tree matching on the query and the tree representations, syntax matching on the query and the syntax representation, and property matching on the query and the property representations.

In one embodiment, the string representation may be used for string-based matching, which may detect lines of code in the code snippet containing the patterns of interest from the query using string-based approach with a set of keywords from the query.

The tree representation may also be used for parser/syntax tree matching. For example, defined keywords and/or patterns may be searched over a parser/syntax tree representation, such as an Abstract Syntax Tree (AST), of the code snippets. The AST structure may eliminate noise from the code snippet, thereby reducing the search space reducing the number of false positives.

The syntax representation may be used for syntax matching. For example, the code snippet may be represented as logical blocks, and matching may be performed on these blocks (e.g., matching a comment section of the code snippet, a variable name, an expression, etc.) and the query.

The property representation may be used for property matching. For example, certain properties of code snippet, such as the number of lines, file locations, import statements, program dependencies, may be used for matching the code snippets to the query.

The output of each of these matching methods will be whether it was a match, the location of the match if there was a match, and which matching method was used.

In addition, each matching method may output a score. For example, the score may take any numerical form, such as a probability between 0 and 1, the number of matches found by the pattern with respect to a given code snippet (e.g., the number of times a keyword from the pattern occurs in the snippet), a confidence score in the match using algorithms such as fuzzy string match, etc. Other scoring methodologies may be used as is necessary and/or desired.

In step 220, the multi-signal matching computer program may combine the scores of two or more of the matching methods (e.g., string-based, parser/syntax tree, syntax, and property). In one embodiment, the combination may be based on full agreement, majority voting, weighted majority voting, etc. In one embodiment, the output may be a ranked result with a matching score, the number of votes received, etc. The output may be presented as probabilities when a machine learning model is used to combine the results.

In step 225, the multi-signal matching computer program may identify code snippet(s) of interest from the combined results. The code snippets of interest may be the code snippets with the highest combined score, etc. In one embodiment, a threshold may be set based on the number of detections, the matching score, etc., and code snippets with a score below the threshold may not be presented.

In step 230, the multi-signal matching computer program may propagate the detection of associated/connected code snippets in a graph. For example, the graph may identify code snippets with the multi-signal pattern matching, and may propagate the detection to associated/connected code snippets.

In embodiments, a code snippet may have dependencies with other code snippets. For example, the code snippets may be plotted as a graph, with the nodes representing functions and global variables, and the edges representing dependencies or links between the two functions. The graph may identify any areas that may be impacted by the issue found. For example, the graph may identify related code snippets to the code snippet that has been matched to the pattern/query. This related code may be impacted by the issue defined by the pattern. For example, if the pattern is a time zone pattern, then the detected code snippet is likely to have functionality related to time zone manipulation. Related code, as defined by the graph structure, will also be involved in this time zone manipulation, and therefore should also be flagged as relevant to the pattern.

In step 235, the multi-signal matching computer program may classify code snippets using machine learning classifier. In embodiments, the machine learning classifier may be trained using user annotations and/or a label dataset. For example, the user annotations may specify whether the code snippet has been identified correctly or incorrectly to further refine the detections and assign probabilistic values to the detection. The sensitivity may be modified by tuning the likelihood threshold of the machine learning model used by the machine learning classifier. For example, the weighting provided each of the matching methods may be changed, the machine learning model may be updated or replaced, etc.

In step 240, the multi-signal matching computer program may output a refined list of code snippets and associated snippets to a user interface. In one embodiment, the refined list may be provided based on their probabilistic values.

In step 245, the multi-signal matching computer program may receive user feedback and may train the machine learning classifier with the user feedback. For example, the multi-signal matching computer program may update weightings for the machine learning classifier, may update or replace the machine learning classifier model, etc.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for multi-signal pattern matching with graph propagation, comprising:
   retrieving, by a multi-signal matching computer program executed by an electronic device, a plurality of code snippets from one or more code repositories;
   generating, by the multi-signal matching computer program, a tree representation, a syntax representation, and a property representation for each of the plurality of code snippets;
   receiving, by the multi-signal matching computer program, a query comprising a query code snippet, natural language keywords, and/or a string pattern;
   performing, by the multi-signal matching computer program, string-based matching and parser/syntax tree matching on the query and the tree representations, syntax matching on the query and the syntax representations, and property matching on the query and the property representations, wherein each of the matchings results in a score;
   combining, by the multi-signal matching computer program, the scores of at least two the string-based matching, the parser/syntax tree matching, the syntax matching, and the property matching;
   identifying, by the multi-signal matching computer program, a plurality of code snippets of interest in the one or more code repositories based on the combined scores;
   classifying, by the multi-signal matching computer program using a machine learning classifier, the code snippets of interest, wherein the machine learning classifier is trained using user annotations and/or a label dataset;
   outputting, by the multi-signal matching computer program, a list of the code snippets of interest with classifications for each of the code snippets of interest;
   receiving, by the multi-signal matching computer program, user feedback on the classifications; and
   training, by the multi-signal matching computer program, the machine learning classifier based on the feedback.

2. The method of claim 1, wherein the code snippets of interest comprise code snippets having a highest combined score.

3. The method of claim 1, wherein the code snippets of interest comprise code snippets having a combined score above a threshold.

4. The method of claim 1, further comprising:
   identifying, by the multi-signal matching computer program, dependencies between the code snippets of interest; and
   propagating, by the multi-signal matching computer program, the dependencies in a graph.

5. The method of claim 1, further comprising:
   linking, by the multi-signal matching computer program, one of the code snippets with a signal.

6. The method of claim 5, wherein the signal indicates whether the code snippet has caused a prior incident.

7. A system, comprising:
   a plurality of code repositories;
   a user interface; and
   an electronic device executing a multi-signal matching computer program that receives a plurality of code snippets from one or more of the plurality of code repositories, generates a tree representation, a syntax representation, and a property representation for each of the plurality of code snippets, receives a query comprising a query code snippet, natural language keywords, and/or a string pattern from the user interface, performs string-based matching and parser/syntax tree matching on the query and the tree representations, syntax matching on the query and the syntax representations, and property matching on the query and the property representations, wherein each of the matchings results in a score, combines the scores of at least two the string-based matching, the parser/syntax tree matching, the syntax matching, and the property matching, identifies a plurality of code snippets of interest in the one or more code repositories based on the combined scores, classifies the code snippets of interest using a machine learning classifier that is trained using user annotations and/or a label dataset, outputs a list of the code snippets of interest with classifications for each of the code snippets of interest, receives user feedback on the classifications from the user interface, and trains the machine learning classifier based on the feedback.

8. The system of claim 7, wherein the code snippets of interest comprise code snippets having a highest combined score.

9. The system of claim 7, wherein the code snippets of interest comprise code snippets having a combined score above a threshold.

10. The system of claim 7, wherein the electronic device executing the multi-signal matching computer program further identifies dependencies between the code snippets of interest and propagates the dependencies in a graph.

11. The system of claim 7, wherein the electronic device executing the multi-signal matching computer program further links one of the code snippets with a signal.

12. The system of claim 11, wherein the signal indicates whether the code snippet has caused a prior incident.

13. An electronic device, comprising:
   a memory storing a multi-signal matching computer program; and
   a computer processor;
   wherein, when executed by the computer processor, the multi-signal matching computer program causes the computer processor to:
   receive a plurality of code snippets from one or more of a plurality of code repositories;

generate a tree representation, a syntax representation, and a property representation for each of the plurality of code snippets;

receive a query comprising a query code snippet, natural language keywords, and/or a string pattern from a user interface;

perform string-based matching and parser/syntax tree matching on the query and the tree representations, syntax matching on the query and the syntax representations, and property matching on the query and the property representations, wherein each of the matchings results in a score, and combine the scores of at least two the string-based matching, the parser/syntax tree matching, the syntax matching, and the property matching;

identify a plurality of code snippets of interest in the one or more code repositories based on the combined scores;

classify the code snippets of interest using a machine learning classifier that is trained using user annotations and/or a label dataset;

output a list of the code snippets of interest with classifications for each of the code snippets of interest:

receive user feedback on the classifications from the user interface; and train the machine learning classifier based on the feedback.

14. The electronic device of claim 13, wherein the code snippets of interest comprise code snippets having a highest combined score.

15. The electronic device of claim 13, wherein the code snippets of interest comprise code snippets having a combined score above a threshold.

16. The electronic device of claim 13, wherein the multi-signal matching computer program further causes the computer processor to identify dependencies between the code snippets of interest and to propagate the dependencies in a graph.

17. The electronic device of claim 13, wherein the multi-signal matching computer program further causes the computer processor to execute the multi-signal matching computer program further links one of the code snippets with a signal.

18. The electronic device of claim 17, wherein the signal indicates whether the code snippet has caused a prior incident.

* * * * *